United States Patent Office 2,754,509
Patented July 10, 1956

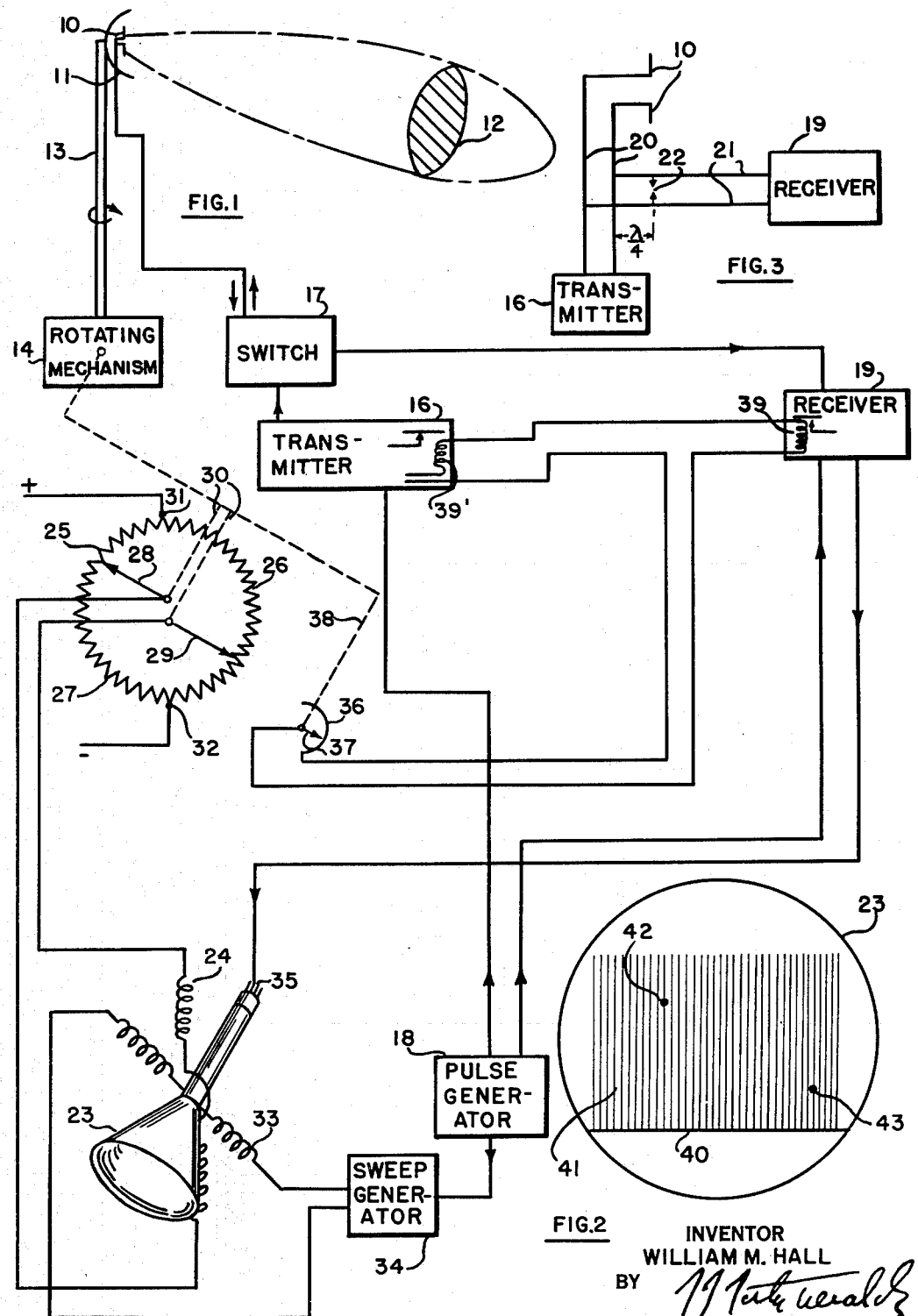

2,754,509

RADIO ECHO DETECTION SYSTEM FOR DETERMINING RANGE AND DIRECTION OF OBJECTS IN SPACE

William M. Hall, Lexington, Mass., assignor to the United States of America as represented by the Secretary of the Navy Application December 7, 1942, Serial No. 468,140

1 Claim. (Cl. 343—11)

This invention relates to a system of detecting and locating objects in space by the use of electromagnetic radiation. It relates particularly to a system which utilizes a new method of scanning with the electromagnetic beam and a new method of correlating the information received.

Electromagnetic radiation has been used to detect and locate objects in space and such detection is based on the principle that if an electromagnetic wave is radiated into space and strikes an object located there it will be reflected back and the reflected wave may be received at the point of radiation. If the time required for this wave to travel out through space to the object and back again is then measured it will be an accurate indication of the distance the object is away from the point of radiation. And if a directional antenna be provided for radiating the wave and the direction in which the antenna points when the wave is radiated is known, this will be an indication of the direction of the reflecting object from the point of radiation. If the electromagnetic waves are radiated at regular intervals and the directional antenna is moved in such a manner that it will scan a field in space, then an object situated within that field can be located by the waves which reflect back from it.

It is one of the objects of the present invention to provide a scanning arrangement for a radio echo detection system by means of which it will be possible to obtain azimuth and range of an object in space.

Another object of the invention is to provide an indicator for a radio echo detection system by means of which the azimuth and the range of an object in space may be instantaneously observed.

Another object of the invention is to provide an indicator and a method of indicating by means of which the azimuth and range of several objects in space may be simultaneously observed.

Still another object of the invention is to provide a radio echo detection system in which the field in space is scanned repeatedly by the beam of electromagnetic radiation in a single path having a horizontal directional component, the cross section of the beam compensating for the lack of scanning in a direction transverse to said path.

Another object of the invention is to provide a system of radio echo detection in which the signal-to-noise ratio is improved over systems heretofore used.

Still another object of the invention is to provide an indicator for a radio echo detection system in which a spot of light representing an object in space is produced on a screen and the position of the spot in one direction is proportional to the angular direction of the object in the plane of scanning, while the position of the spot in another direction is proportional to the range of the object.

Other objects and objects relating to the arrangement of the various parts of the apparatus and the electrical connection therebetween will be apparent as the description of the invention proceeds.

One embodiment of the invention has been illustrated in the accompanying drawings in which:

Fig. 1 is a diagrammatical representation of the parts of my invention showing the manner in which they are connected together and cooperate to produce the desired results;

Fig. 2 is a front view of an indicator showing one manner in which the azimuth and range may be simultaneously represented, and Fig. 3 is a circuit diagram of the switch for alternately connecting the transmitter and receiver to the antenna.

Referring to Fig. 1 of the drawing, a directive antenna system 10 is shown for radiating a relatively concentrated beam of electromagnetic waves into space. The antenna and associated reflector 11 may preferably be so designed that the cross section of the beam is relatively narrow in a horizontal direction, although spread through a greater angle in a vertical direction, as indicated by the pattern 12 in the drawings. The antenna 10 and associated reflector are mounted in a suitable manner, as, for instance, on a vertical axis 13 and supporting mechanism 14 by means of which the antenna assembly is caused to rotate about the vertical axis, driven from a suitable source of power, not shown. This causes the radiated beam to scan a field in space in one coordinate, there being no movement of the beam in the plane of the axis.

A transmitter 16 is connected to the antenna 10 through a two-way switch 17; and the transmitter 16 has connected to it a pulse generator or timer 18 by means of which the oscillations produced by the transmitter may be modulated so that successive pulses may be sent out from the antenna 10, the transmitter being off in the interval between pulses.

The vertical inclination of the antenna system may be fixed to direct the beam at some predetermined angle, as, for instance, in the downwardly direction indicated in Fig. 1, which may be desirable when the system is to be used in an airplane to detect the presence of ships on the ocean beneath it. The spread of the beam in the vertical direction will depend on the particular service for which the system is designed. It is preferred to make the horizontal spread of the beam relatively narrow in order that the horizontal component of direction of the antenna system may be accurately determined when the beam is intercepted by an object.

A receiver 19 is also provided, and this receiver is connected through the switch 17 to the antenna 10. The switch 17 may be of the discharge type which will automatically shift the antenna back and forth between the transmitter and the receiver. The arrangement is such that the transmitter is connected to the antenna 10 whenever a pulse is produced by the pulse generator 18, while, during the time interval between pulses when the transmitter is off, the receiver 19 is connected to the antenna 10. Thus, there is no radiation from the antenna at all except for the duration of each pulse.

One form of such a switch has been illustrated in Fig. 3. Here the antenna 10 is shown connected to the transmitter 16 by means of two spaced parallel wires 20. The receiver 19 is connected by means of spaced parallel wires 21 to the wires 20, and the wires 21 are provided with a spark gap 22 at a distance from the wires 20 equal to one-quarter of the wave length, $\lambda$, measured on the transmission line, of the particular carrier wave for which the system is designed. This distance is indicated on the drawing as $$\frac{\lambda}{4}$$

The transmitter 16 is arranged so that it presents low impedance to the line 20 when it is operating, which impedance will be the characteristic impedance of the line, but when it is not operating the impedance is high. When the transmitter is operating, the voltage across the spark gap 22 causes a discharge to take place which has the effect of shorting the receiver 19. However, because of standing waves in the quarter-wave-length section between the spark gap 22 and the line 20, this section will appear to the transmitter as an open circuit. Hence energy from the transmitter passes to the antenna 10 and substantially little reaches the receiver 19. On the other hand, when the transmitter is off and the antenna 10 receives a signal, the impedance looking into the transmitter is high while the impedance looking into the receiver is low and the energy passes from the antenna 10 to the receiver 19. The arrangement works automatically, the receiver being short-circuited when the transmitter is operating and being connected to the antenna when the transmitter is off.

I preferably use a wave length of the order of those measured in centimeters and produce the pulses at uniform rapid rate, each pulse being a small fraction of a second in time duration.

The rotation of the antenna may be relatively slow, for instance, 200 R. P. M., which means that there are a great number of pulses radiated for each scanning cycle. The time interval between pulses should be sufficient to permit a pulse to be radiated into space and be reflected back from an object within the desired range of the apparatus before the receiver is shut off and the next pulse is radiated. The power of the transmitter and sensitivity of the receiver may be adjusted so that signals from objects at greater distances will not interfere with the operation of the system.

A cathode ray tube 23 may be used as an indicator for the system and I have disclosed one having magnetic deflection of the electron beam, although it will be understood that an electrostatic deflection tube may be used, if desired. The necessary voltages for the focussing electrode, the anode, cathode, and heating filament are supplied from sources not shown, and the wiring to these electrodes has been omitted for clearness.

Horizontal deflecting coils 24 are spaced about the neck of the tube in a well-known manner and are provided with current from a potentiometer 25 which is operatively connected to the mechanism 14 which rotates the antenna 10. The potentiometer 25 may comprise, as shown, a pair of semicircular windings 26 and 27 provided with separate contact arms 28 and 29. These arms are arranged diammetrically opposite each other and are mechanically connected, as indicated by the dotted line 30 to the mechanism for rotating the antenna 10. As the antenna 10 rotates, the potentiometer arms 28 and 29 travel around the semicircular windings 26 and 27 in contact therewith.

The ends of the windings 26 and 27 are connected together and the midpoints 31 and 32, respectively, are connected across a suitable source of potential. The horizontal deflecting coils 24 are connected in series, the outer ends of the coils being connected to the arms 28 and 29 of the potentiometer. It will be seen that as the antenna 10 rotates also rotating the arms 28 and 29 of the potentiometer, the current flowing in the deflecting coils is gradually changed and eventually also the direction of the current, as the contact arms cross the ends of the potentiometer windings. This changes the strength and polarity of the magnetic field produced by the coils. The electron beam will thus be moved from side to side and the spot of light produced by the beam will move from side to side across the face of the tube.

A pair of vertical deflecting coils 33, connected in series, are also mounted on the neck of the tube and the ends thereof are connected to a sweep current generator 34 which is in turn connected to the pulse generator 18. The sweep generator is designed to produce a saw-tooth current wave which will energize the vertical deflecting coil 33 so as to give the electron beam a substantially linear vertical sweep, the return sweep being made in a very much shorter interval of time. The sweep generator is controlled by the pulse generator, the arrangement being such that the saw-tooth wave starts to rise when one of the pulses is radiated and continues to rise during substantially all or a part of the time interval between pulses. This will cause the spot of light on the cathode ray tube 23 to start moving up when one of the pulses is radiated and continue to move up so as to reach the upper limit of its vertical excursion shortly before the next pulse starts.

The control grid terminal 35 of the cathode ray tube is connected to the output of the radio receiver 19. Whenever a pulse is received by the receiver as a reflection from an object in space intercepting the beam of radiation from the antenna 10, the grid of the cathode ray tube will be swung in a positive direction, thus increasing the intensity of the spot of light on the face of the tube. The intensity of the spot is also preferably decreased at the end of the vertical trace so that its return to the lowermost position will not be seen. This may be done by a blanking pulse controlled by the pulse generator which is shown connected to the receiver.

If desired, the horizontal dimension of the cathode ray tube's face may correspond with 360° of azimuth angle. However, for certain purposes, I desire to scan through an angle of 180°, although I cause the antenna to make a complete 360° rotation. For this purpose I provide a semicircular sliding contact switch 36, the rotating arm 37 of which is connected mechanically, as indicated by the dotted line 38 to the mechanism 14 for operating the antenna. This switch is connected to a suitable relay 39 in the receiver and is arranged in such a manner that the switch is making contact during 180° of rotation of the scanner which operates the relay 39 to maintain the receiver operating during this time, but the switch is out of contact during the remainder of the complete rotation and the receiver is inoperative at this time. By means of this arrangement, the spot of light on the cathode ray tube will move in one direction only across the tube, the receiver causing the spot to disappear during the period it would normally be making the retrace.

A relay 39' may also be provided at the transmitter 16 and may be connected to operate with the relay 39 to shut off the transmitter during the 180° of scan when it is not being used. This permits the transmitter to cool and also saves power.

With the arrangement described above, the indication on the face of the tube will resemble somewhat that shown in Fig. 2. The normal operation of the horizontal deflection coils, under control of the potentiometer, which is in turn controlled by the antenna mechanism, will move the spot of light across the tube along a horizontal line which may be indicated at 40. As each pulse is transmitted from the antenna 10, the spot of light is deflected vertically, forming one of the traces 41. When one of the radiated pulses is reflected back from an object in space and is received by the receiver, it swings the control grid of the cathode ray tube in the positive direction which causes the intensity of the light spot to increase. The time that the pulse is received by the receiver will depend upon the distance the object is away from the antenna 10. Thus the distance the spot 42 is from the horizontal line 40 will be proportional to the range of the object from the antenna. Any number of objects will thus appear on the face of the cathode ray tube, as, for instance, the object 43; and the horizontal position of each of these light spots will indicate the azimuth angle of the object it represents, while the distance from the horizontal line 40 will represent the range of the object. By a proper calibration of the face of the tube this latter measurement may be indicated in yards or any other desired unit of linear measurement.

It will be understood that by adjusting the bias on the control grid of the cathode ray tube the intensity of the light spot may be controlled. It is therefore possible to have just sufficient intensity of the spot as it moves under control of the sweep circuit to make it visible during each vertical sweep. This will give the effect of a dimly lit screen with any signal received, such as from a detected object, appearing as a much brighter spot. But it is also possible to adjust the bias of the cathode ray tube control grid so that no light at all appears, except the spots 42 and 43, representing objects in space. Wherever in the claims reference is made to moving a spot of light, it will be understood that the intensity of that spot may be so low as to be below visibility, to come within the possible operation of the cathode ray tube noted above.

There may be some leakage of the radiated pulses into the receiver which would produce bright spots at the lowermost ends of the vertical traces 41, and the row of spots thus produced may serve as a base line from which to measure the range of the signals. However, if desired, a base line 40 may be drawn on the face of the tube or otherwise applied to it for this purpose.

It will be seen that I have provided a system by means of which a given field may be scanned in one coordinate only so as to produce a directional component in the horizontal plane, while the azimuth and range of an object within that field may be simultaneously observed on the indicator. Under many conditions the azimuth and range are sufficient to locate the object, as, for instance, where the radio echo detection equipment is used in an airplane to locate ships on the sea beneath. Here, as long as the range is known and the azimuth angle, the ship can be definitely located.

In many cases it is preferable to use a single antenna as shown and described, and to connect it alternately to the transmitter and receiver. However, it should be understood that the transmitter and receiver may have separate antennas. In such a case, it is preferable to provide a switching arrangement to shut off the transmitter between pulses and to shut off the receiver while the transmitter is operating, so that the receiver will not become blocked by the strength of the signal from the transmitter; or the receiver antenna may be mounted in such a position or in such a manner as to be shielded from the energy radiated from the transmitting antenna.

While I have shown and described a cathode ray tube for providing the indication, other devices for accomplishing this purpose may also be used. Also, I have shown the azimuth angle as controlling the horizontal coordinate of the spot of light and the range the vertical coordinate. It will be understood that other coordinates might be used, as, for instance, the azimuth might be represented as a polar coordinate with the range the distance from the center.

If desired, the cathode ray tube may have a long persistence screen, so that a spot of light produced by an echo signal will remain on the screen until the scanning cycle has been completed or nearly completed. This is desirable especially where the scanning rate is relatively slow.

In the arrangement shown the antenna scans about a single axis only and the tube 23 indicates azimuth and range. This type of indication may also be used with an antenna system which is caused to scan about two axes, thus having, for instance, an azimuth component and an elevation component. In such a case the tube 23 would be used in addition to some indicating device, such as another cathode ray tube, which would be arranged to indicate, for instance, azimuth and elevation. The azimuth and elevation of an object could then be determined by observing the last mentioned indicating device, while the range for that particular object could be accurately determined by the tube 23, the object being identified by its azimuthal position on the tube.

The system of the invention may be used on land, in ships at sea, and in airplanes. Various embodiments of the invention may be used without departing from the spirit thereof and I do not therefore wish to limit myself to what has been shown and described except as such limitations occur in the appended claim.

What I desire to claim and secure by Letters Patent is:

In a system for radio echo detection, in combination, a pulse transmitter for producing high-frequency electromagnetic oscillations modulated to produce a succession of pulses, a directional scanning antenna coupled to said transmitter to radiate said modulated oscillations in a substantially narrow beam of electromagnetic waves, means to rotate said antenna to produce a component of scanning motion in a predetermined plane, a resistor winding arranged in a continuous circle and energized at diametrically opposite points from a source of electrical energy and having a pair of movable contacts mechanically linked to said antenna for synchronous movement therewith and insulated from each other and in electrical contact with said winding for generating a signal across said contacts indicative of the instantaneous angular position of said antenna measured in said predetermined plane, a cathode ray tube indicator including a screen and an electron beam, means to move said electron beam across said screen parallel to a first axis in response to said signal across said contacts, the position of said electron beam along said axis corresponding at all times to the component of scanning motion in said predetermined plane, means to deflect said electron beam at a uniform rate and in a direction at right angles to said axis each time a pulse is radiated, said deflection commensing at the instant of radiation of a pulse, said electron beam starting from a predetermined line on said screen parallel to said axis and returning to said line before the start of the next pulse, a receiver coupled to said antenna to receive radiation reflected back from objects within the path of said scanning beam, means to cause signals derived from received radiation to increase the intensity of said electron beam, thereby to produce a spot of light on said screen whereby the perpendicular distance of said spot of light from said predetermined line on said screen will correspond to the distance from said object producing the spot of light to said antenna and the position of said spot of light in a direction parallel to said axis will represent the angular direction to said object from said antenna measured in said predetermined plane, and means coupled to said antenna for rendering both said receiver and said transmitter inoperative for a predetermined period.

References Cited in the file of this patent

UNITED STATES PATENTS

| | | |
|---|---|---|
| 2,055,883 | Terry | Sept. 29, 1936 |
| 2,143,035 | Smith | Jan. 10, 1939 |
| 2,151,917 | Hyland | Mar. 28, 1939 |
| 2,189,549 | Hershberger | Feb. 6, 1940 |
| 2,227,598 | Lyman et al. | Jan. 7, 1941 |
| 2,231,929 | Lyman | Feb. 18, 1941 |
| 2,237,604 | Marique | Apr. 8, 1941 |
| 2,409,448 | Rost et al. | Oct. 15, 1946 |
| 2,412,669 | Bedford | Dec. 17, 1946 |
| 2,412,702 | Wolff | Dec. 17, 1946 |
| 2,414,469 | Isbister | Jan. 21, 1947 |
| 2,419,205 | Feldman | Apr. 22, 1947 |
| 2,423,104 | Labin | July 1, 1947 |
| 2,424,984 | Hoffman | Aug. 5, 1947 |

FOREIGN PATENTS

| | | |
|---|---|---|
| 108,556 | Australia | Sept. 14, 1939 |